US011619366B2

(12) United States Patent
Chien et al.

(10) Patent No.: US 11,619,366 B2
(45) Date of Patent: Apr. 4, 2023

(54) LIGHT SOURCE MODULE

(71) Applicant: Qisda Corporation, Taoyuan (TW)

(72) Inventors: Chih-Shiung Chien, Taoyuan (TW); Ming-Kuen Lin, Taoyuan (TW); Tsung-Hsun Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/575,722

(22) Filed: Jan. 14, 2022

(65) Prior Publication Data

US 2022/0252240 A1 Aug. 11, 2022

(30) Foreign Application Priority Data

Feb. 9, 2021 (CN) .......................... 202110175159.7

(51) Int. Cl.
*F21V 9/30* (2018.01)
*G02B 19/00* (2006.01)
*G02B 26/00* (2006.01)
*G02B 27/14* (2006.01)

(52) U.S. Cl.
CPC ............ *F21V 9/30* (2018.02); *G02B 19/0047* (2013.01); *G02B 26/008* (2013.01); *G02B 27/141* (2013.01)

(58) Field of Classification Search
CPC .......... F21V 13/14; F21V 7/0025; F21V 9/30; G02B 19/00; G02B 26/00
See application file for complete search history.

(56) References Cited

U.S. PATENT DOCUMENTS 10,509,303 B2 * 12/2019 Li ......................... G03B 21/208
2014/0211170 A1 * 7/2014 Kitano ................. G03B 21/204
362/84
2018/0157050 A1 * 6/2018 Liao .................... G03B 21/2066

* cited by examiner

Primary Examiner — William J Carter

(57) ABSTRACT

A light source module includes a light source, a dichroic unit, a color wheel and a wavelength conversion unit. The light source is configured to emit a light. The dichroic unit is opposite to the light source and configured to reflect a portion of the light as a first illumination light in a first direction and reflect a portion of the light as a second illumination light in a second direction inverse to the first direction. The color wheel is opposite to the dichroic unit and configured to at least receive the first illumination light. The color wheel has a blue filter area, a green filter area and a red filter area. The wavelength conversion unit is opposite to the color wheel and the dichroic unit and configured to at least receive the second illumination light and provide a converted light to the color wheel.

20 Claims, 5 Drawing Sheets

US 11,619,366 B2

LIGHT SOURCE MODULE

This application claims the benefit of People's Republic of China application Serial No. 202110175159.7, filed on Feb. 9, 2021, the subject matter of which is incorporated herein by reference.

BACKGROUND OF THE INVENTION

Field of the Invention

The invention relates in general to a light source module, and more particularly to a light source module with a wavelength conversion unit.

Description of the Related Art

The light source module of a conventional projector provides an illumination light to an illumination module, which then converts the illumination light into an image light projected outwards. Generally speaking, to meet the color change of the image light, the light source module normally converts a blue light into other color light. However, a portion of the blue light will inevitably be wasted on the optical path during the transmission and/or conversion of the blue light. Therefore, it has become a prominent task for the industries of the technology field to recycle the blue light to increase the utilization rate of the light.

SUMMARY OF THE INVENTION

The invention is directed to a light source module capable of resolving the problems encountered in the prior art.

According to one embodiment of the present invention, a light source module including a light source, a dichroic unit, a color wheel and a wavelength conversion unit is provided. The light source is configured to emit a first light. The dichroic unit is opposite to the light source and configured to reflect a portion of the first light as a first illumination light in a first direction and reflect a portion of the first light as a second illumination light in a second direction inverse to the first direction. The color wheel is opposite to the dichroic unit and configured to at least receive the first illumination light. The color wheel has a blue filter area, a green filter area and a red filter area. The wavelength conversion unit is opposite to the color wheel and the dichroic unit and configured to at least receive the second illumination light and provide a converted light to the color wheel.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1:
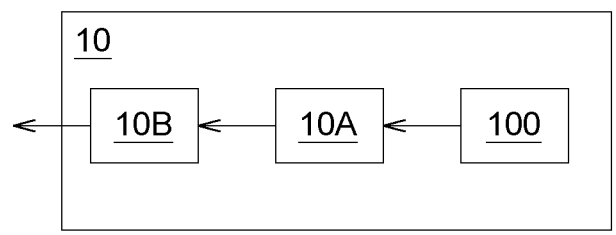
FIG. 1 is a functional block diagram of a projection device according to an embodiment of the present invention.
Figure 2:
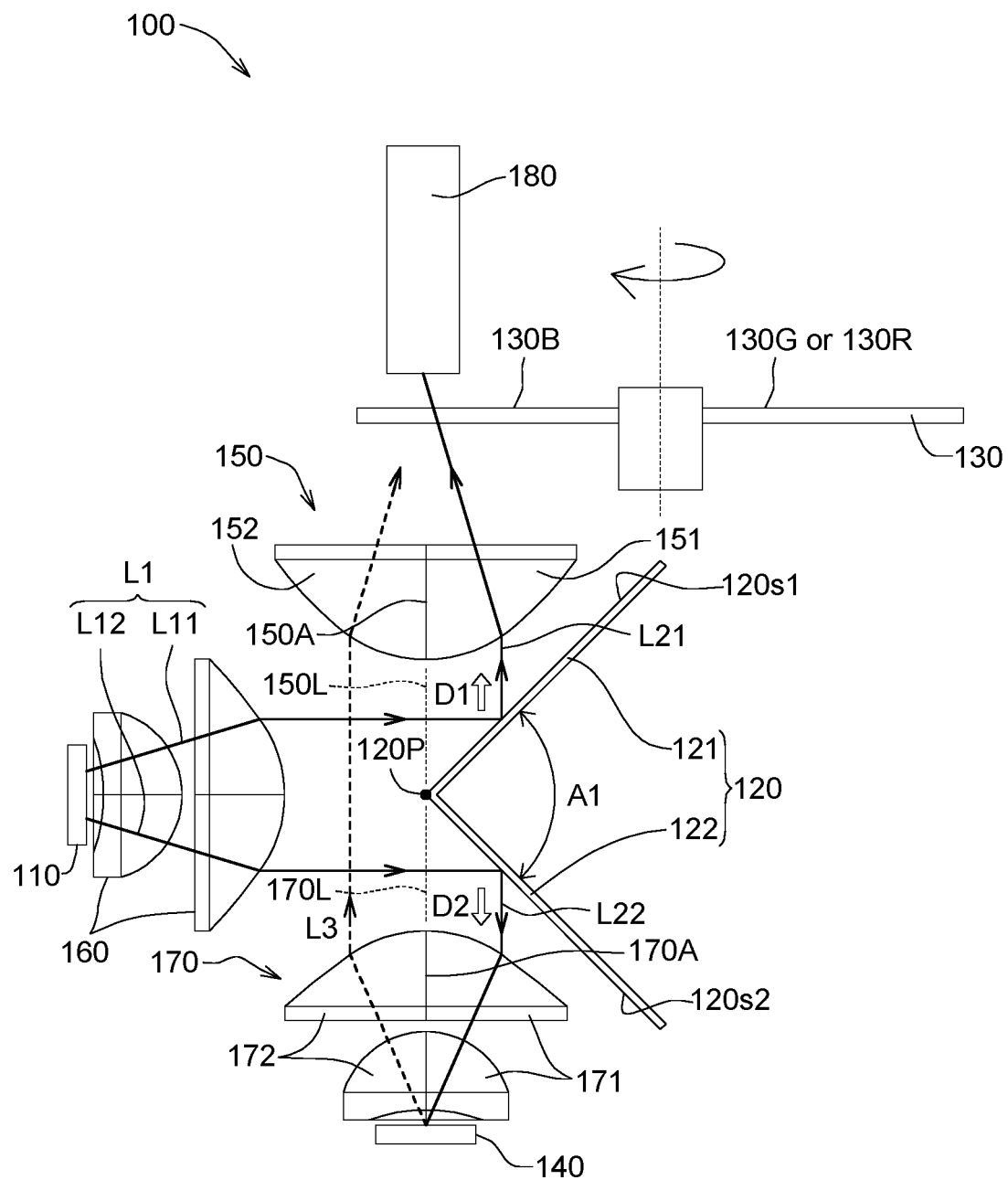
FIGS. 2 to 3 are schematic diagrams of an optical path of a light source module of the projection device of FIG. 1.
Figure 3:
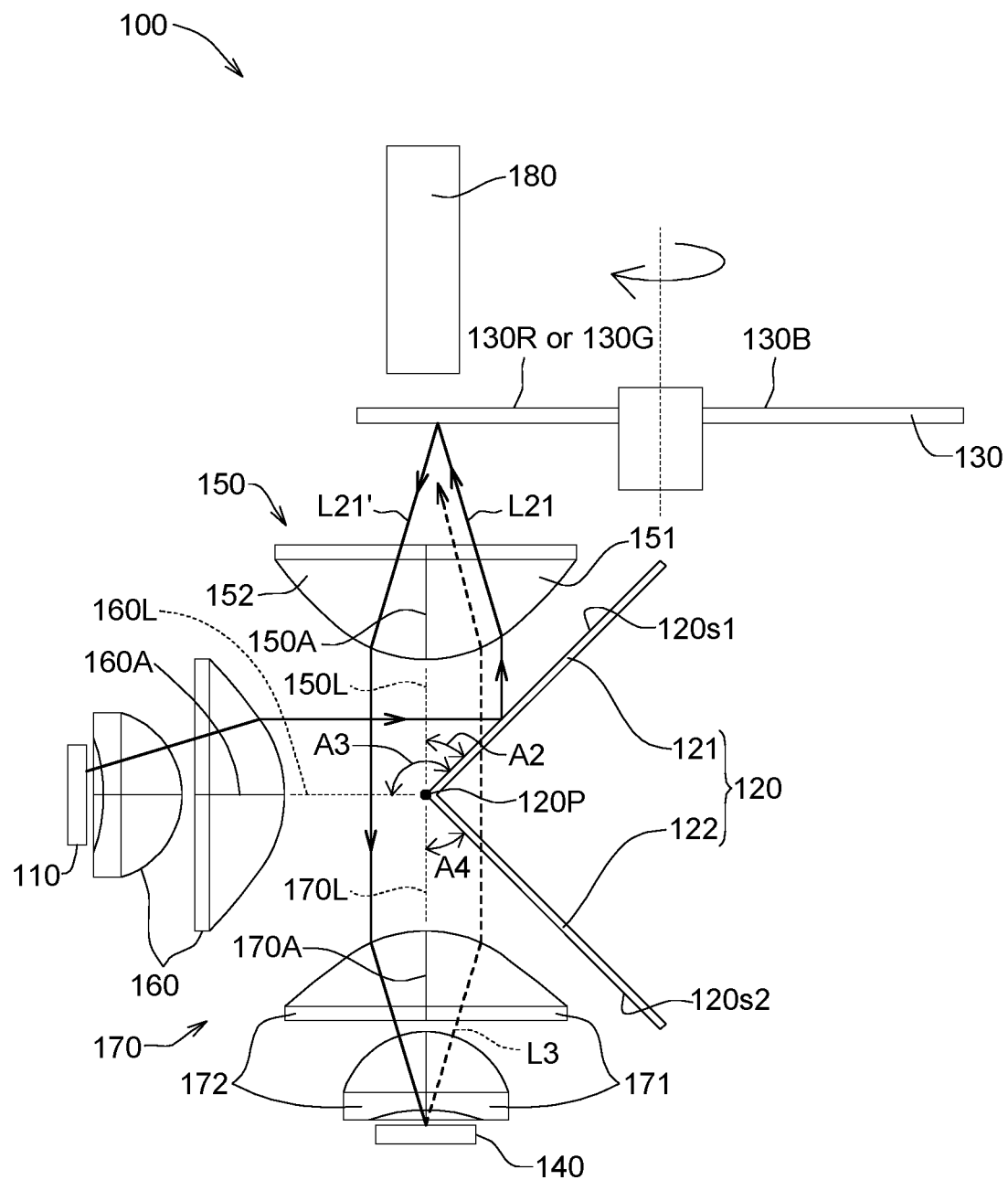
Figure 4:
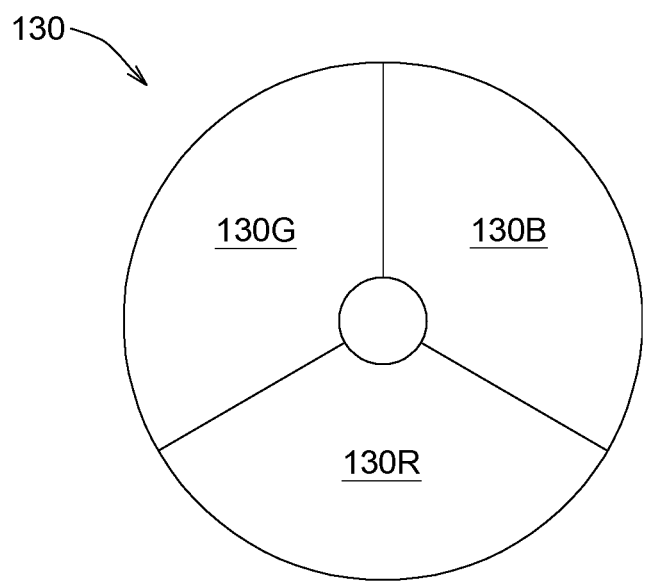
FIG. 4 is a schematic diagram of a color wheel of the projection device of FIG. 2.
Figure 5:
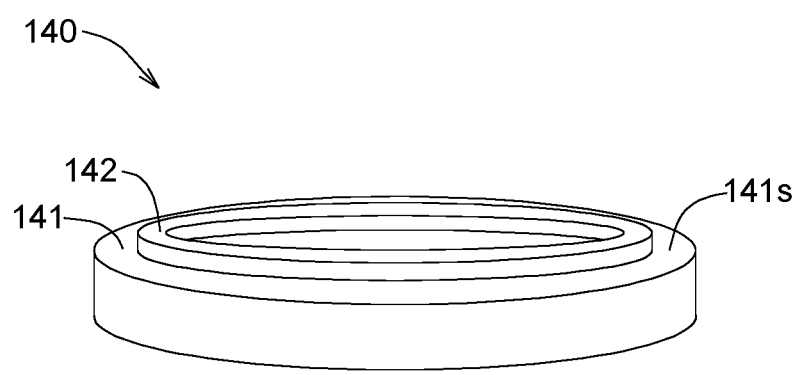
FIG. 5 is a schematic diagram of a wavelength conversion unit of the projection device of FIG. 2.

Refer to FIGS. 1 to 5. FIG. 1 is a functional block diagram of a projection device 10 according to an embodiment of the present invention. FIGS. 2 to 3 are schematic diagrams of an optical path of a light source module 199 of the projection device 10 of FIG. 1. FIG. 4 is a schematic diagram of a color wheel 130 of the projection device 10 of FIG. 2. FIG. 5 is a schematic diagram of a wavelength conversion unit 140 of the projection device of FIG. 2.

The projection device 10 includes a light source module 100, an illumination module 10A and an imaging device 10B. The light source module 100 provides a light projected to a screen (not illustrated) through the illumination module 10A and the imaging device 10B. The illumination module 10A at least includes a light valve, such as a digital micromirror device (DMD), and is configured to convert an illumination light into an image light (or referred as "patterned light"). The imaging device 10B includes at least one lens configured to project the image light onto the screen.

As indicated in FIG. 2, the light source module 100 includes a first light source 110, a dichroic unit 120, a color wheel 130, a wavelength conversion unit 140, a condenser lens 150, a first collimator lens 160, a second collimator lens 170 and a light guide column 180. In another embodiment, the light guide column 180 could be disposed on the illumination module 10A.

As indicated in FIG. 2, the first light source 110 is configured to emit a first light L1. The dichroic unit 120 is opposite to the first light source 110 and is configured to reflect the first portion L11 of the first light L1 as a first illumination light L21 in a first direction D1 and reflect the second portion L12 of the first light L1 as a second illumination light L22 in a second direction D2, wherein the first direction D1 is inverse to the second direction D2. The color wheel 115 is opposite to the dichroic unit 120 and is configured to at least receive the first illumination light L21. The color wheel 130 has a blue filter area 130B, a green filter area 130G and a red filter area 130R (As indicated in FIG. 4). The wavelength conversion unit 140 is opposite to the color wheel 130 and the dichroic unit 120 and is configured to at least receive the second illumination light L22 and provide a converted light L3 to the color wheel 130. Thus, the same dichroic unit 120 could divide the first light L1 into two portions (such as the first portion L11 and the second portion L12) for reflecting the light to the color wheel 130 and the wavelength conversion unit 140 respectively. In an embodiment, the first illumination light L21 and the second illumination light L22 reflected from the dichroic unit 120 differ with each other by about 180°.

In the present embodiment, the first light source 110 could be realized by such as a light emitting diode (LED) or a laser light source, but the present invention is not limited thereto. The first light L1 has a first wavelength, the converted light L3 has a second wavelength, and the first wavelength and the second wavelength are different. In an embodiment, the first wavelength could be less than or equivalent to 460 nm, and the second wavelength could be in a range of 460 nm to 680 nm (including the values of the end points). In terms of the light color, the first light L1 could be a blue light, and the converted light L3 could be a yellow light.

As indicated in FIG. 2, the dichroic unit 120 could be realized by a dichroic light lens capable of reflecting the light with the first wavelength and allowing the light with the second wavelength to pass through, wherein the first wavelength and the second wavelength are different. The dichroic unit 120 includes a first reflective portion 121 and a second reflective portion 122 connected to the first reflective portion 121. The first reflective portion 121 is configured to reflect the first portion L11 of the first light L1 as a first illumination light L21, and the second reflective portion 122 is configured to reflect the second portion L12 of the first light L1 as a second illumination light L22. The first reflective portion 121 of the dichroic unit 120 has a first reflective surface 120s1 for reflecting the first illumination light L21, and the second reflective portion 122 has a second reflective surface 120s2 for reflecting the second illumination light L22. Besides, the first reflective portion 121 and the second reflective portion 122 form an angle A1 which is less than 180°. For example, the angle A1 is equivalent to 45°, 90°, 135° or any integer other than 0° or 180°, that is, the first reflective portion 121 and the second reflective portion 122 do not overlap. In terms of the appearance, the dichroic unit 120 is V-shaped. Moreover, the first reflective portion 121 and the second reflective portion 122 could be integrally formed in one piece.

The green filter area 130G and the red filter area 130R of the color wheel 130 could reflect the first light L1. Furthermore, the green filter area 130G could filter a green light off the converted light L3, and the green light could pass through the green filter area 130G. Similarly, the red filter area 130R could fitter a red light off the converted light L3, and the red light could pass through the red filter area 130R.

The color wheel 130 is rotatable and could make the blue filter area 130B, the green filter area 130G and the red filter area 130R be aligned with the condenser lens 150 at different time points. When the blue filter area 130B is aligned with the condenser lens 150, the blue light could pass through the blue filter area 130B, but the yellow light is reflected from the blue filter area 130B. When the green filter area 130G is aligned with the condenser lens 150, the green light component of the yellow light could pass through the green filter area 130G. When the red filter area 130R is aligned with the condenser lens 150, the red light component of the yellow light could pass through the red filter area 130R.

The wavelength conversion unit 140 could include several fluorescent particles (not illustrated) for converting the wavelength of the light, for example, converting a first wavelength to a second wavelength. In the present embodiment as indicated in FIG. 5, the wavelength conversion unit 140 includes a carrier 141 and a wavelength conversion layer 142, wherein the wavelength conversion layer 142 is disposed on the carrier 141 and includes several fluorescent particles. The wavelength conversion layer 142 could convert the wavelength of the light. The carrier 141 has a carrying surface 141s on which the wavelength conversion layer 142 is disposed. In the present embodiment, the wavelength conversion unit 140 could be rotatable or fixed. Through rotation, the rotatable wavelength conversion unit 140 could avoid the incident light being projected to the same point of the wavelength conversion unit 140, such that heat dissipation could be improved, and the problems caused by heat accumulation (such as reduced conversion efficiency and thermal attenuation) could be resolved. Moreover, in the present embodiment, the wavelength conversion layer 142 could be ring-shaped and in the shape of a closed ring. Thus, when the wavelength conversion unit 140 rotates, the light could be continuously projected to the wavelength conversion layer 142 and wavelength conversion of the light could be performed.

The condenser lens 150, such as a beam compressing lens, could reduce the diameter of the light passing through the lens. The first collimator lens 160 and the second collimator lens 170 could convert the light passing through the lens to a collimated light. Each of the condenser lens 150, the first collimator lens 160 and/or the second collimator lens 170 includes at least one optical lens. The number of optical lenses of the condenser lens 150, the first collimator lens 160 and/or the second collimator lens 170 is not specified in the present invention, and any number would do as long as the optical effect of beam compressing and colimitation could be achieved.

As indicated in FIG. 3, when the red filter area 130R or the green filter area 130G of the color wheel 130 is aligned with the condenser lens 150, the first illumination light L21 passing through the condenser lens 150 (such as a blue light) is reflected from the red filter area 130R or the green filter area 130G to form a reflected light L21'. The reflected light L21' (such as blue light) is projected to the wavelength conversion unit 140 by sequentially passing through the condenser lens 150 and the second collimator lens 170. The wavelength conversion unit 140 converts the reflected light L21' into a converted light L3 which is projected to the color wheel 130 by sequentially passing through the second collimator lens 170, the dichroic unit 120 and the condenser lens 150. Since the dichroic unit 120 allows the light with a second wavelength to pass through, the converted light L3 with the second wavelength could pass through the dichroic unit 120. To summarize, the light source module 100 of the present invention could recycle the reflected light L21' and therefore increases the utilization rate of the light. Moreover, when the reflected light L21' is converted into the converted light L3 by the wavelength conversion unit 140, the amount of the converted light L3 projected to the color wheel 130 could be increased and so could the amount of the red light and the green light filtered off by the color wheel 130 be increased.

The converted light L3 has at least two sources, one is the second illumination light L22 as indicated in FIG. 2 and the other is the reflected light L21' recycled by the color wheel 130 as indicated in FIG. 3, such that the amount of the converted light L3 projected to the color wheel 130 could be increased, and so could the amount of the red light and the green light filtered off by the color wheel 130 be increased.

In an embodiment, the converted light L3 of FIG. 2 is projected to the blue filter area 130B of the color wheel 130, then the converted light L3 is reflected to the wavelength conversion unit 140 from the blue filter area 130B for further use. Similarly, the converted light L3 of FIG. 3 is projected to the red filter area 130R or the green filter area 130G of the color wheel 130, such that the red light or the green light could be filtered off. Although it is not illustrated in FIG. 3, the optical path of the converted light L3 of FIG. 2 could also be realized in the optical path of FIG. 3.

As indicated in FIG. 2, the condenser lens 150 includes a first portion 151 and a second portion 152, and the first illumination light L21 passes through the first portion 151. As indicated in FIG. 3, the first illumination light L21 is reflected from the color wheel 130 to form a reflected light L21' which is projected to the wavelength conversion unit 140 through the second portion 152. In the present embodiment, since the reflected light L21' does not have to pass through the first portion 151, the reflected light L21' will not be blocked by the dichroic unit 120, and most or even all of the reflected light L21' could be projected to the second collimator lens 170 or the wavelength conversion unit 140.

As indicated in FIG. 3, the optical path 150A of the condenser lens 150 is located between the first portion 151 and the second portion 152. The dichroic unit 120 corresponds to the first portion 151 in an extending direction of the optical path 150A. For example, the entire dichroic unit 120 corresponds to the first portion 151 in the extending direction of the optical path 150A or the entire dichroic unit 120 is located on one side of the extending line 150L of the optical path 150A. Thus, the dichroic unit 120 will not block the reflected light L21' reflected from the color wheel 130. Moreover, the dichroic unit 120 has a turning point 120P which is located on an extending line 150L of the optical path 150A of the condenser lens 150 (such as overlapping the extending line 150L) or is separated from the extending line 150L of the optical path 150A by a distance.

Furthermore, in the present embodiment, the optical path 150A of the condenser lens 150 and the first reflective surface 120s1 of the dichroic unit 120 form an angle A2 of such as 45°, but the present invention is not limited thereto.

The first collimator lens 160 is located between the dichroic unit 120 and the first light source 110. The turning point 120P of the dichroic unit 120 is located on an extending line 160L of the optical path 160A of the first collimator lens 160, such that the amount of the first portion L11 projected to the first reflective portion 121 is substantially identical to the amount of the second portion L12 of the first light L1 projected to the second reflective portion 122. In another embodiment, the dichroic unit 120 could be adjusted in the extending line 150L of the dichroic unit 120, such that the turning point 120P of the dichroic unit 120 is not located on the extending line 160L of the optical path 160A of the first collimator lens 160. In the present embodiment, the first reflective surface 120s1 of the dichroic unit 120 and the optical path 160A of the first collimator lens 160 form an angle A3 of 135°.

As indicated in FIG. 2, the second collimator lens 170 is located between the dichroic unit 120 and the wavelength conversion unit 140. The second collimator lens 170 includes a third portion 171 and a fourth portion 172, the second illumination light L22 is projected to the wavelength conversion unit 140 through the third portion 171, and the reflected light L21' reflected from the color wheel 130 (illustrated in FIG. 3) is projected to the wavelength conversion unit 140 through the fourth portion 172. In the present embodiment, the optical path 170A of the second collimator lens 170 of the dichroic unit 120 is located between the third portion 171 and the fourth portion 172, and the dichroic unit 120 corresponds to the third portion 171 in an extending direction of the optical path 170A of the second collimator lens 170. For example, the entire dichroic unit 120 corresponds to the third portion 171 in the extending direction of the optical path 170A, or the entire dichroic unit 120 is located on one side of the extending line 170L of the optical path 170A. Thus, the dichroic unit 120 will not block the reflected light L21' reflected from the color wheel 130 (the reflected light L21' is illustrated in FIG. 3). Besides, the turning point 120P of the dichroic unit 120 is located on the extending line 170L of the optical path 170A of the second collimator lens 170 (such as overlapping the extending line 170L) or is separated from the extending line 170L of the optical path 170A by a distance.

As indicated in FIG. 2, the extending line 150L of the optical path 150A of the condenser lens 150 substantially overlaps the extending line 170L of the optical path 170A of the second collimator lens 170, but the present invention is not limited thereto.

As indicated in FIG. 3, the second reflective surface 120s2 of the dichroic unit 120 and the optical path 170A of the second collimator lens 170 form an angle A4 of 45°. The wavelength conversion unit 140 converts the second illumination light L22 into a converted light L3 which is projected to the color wheel 130 through the second collimator lens 170.

The values of the said angles A2 to A4 depend on the angle A1 between the first reflective portion 121 and the second reflective portion 122 of the dichroic unit 120 and/or the arrangement direction (or posture) of the dichroic unit 120 are not subjected to specific restrictions in the present invention.

Figure 6:
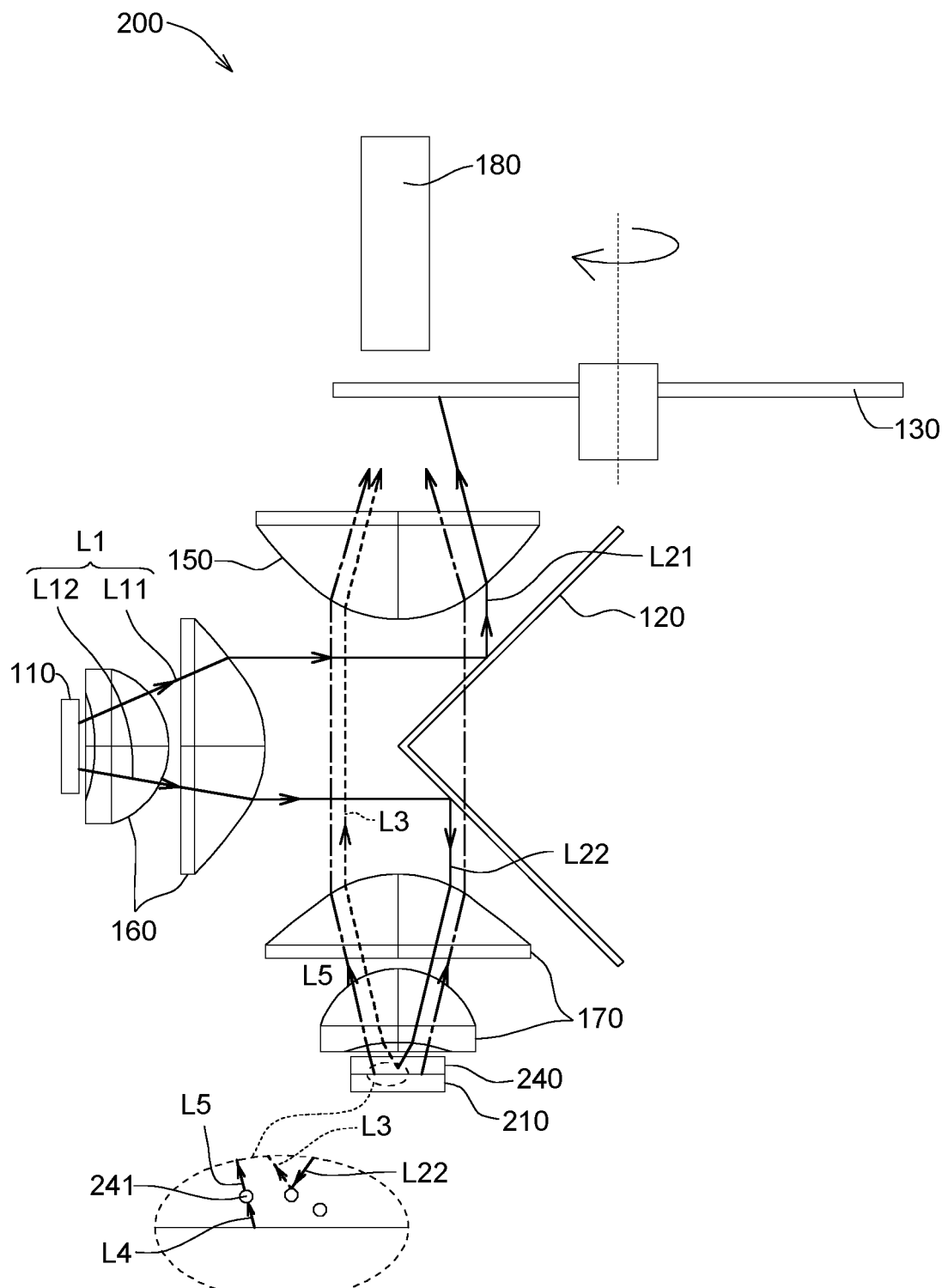
FIG. 6 is a schematic diagram of a light source module according to another embodiment of the present invention.

Referring to FIG. 6, a schematic diagram of a light source module 200 according to another embodiment of the present invention is shown. The light source module 200 includes a first light source 110, a dichroic unit 120, a color wheel 130, a wavelength conversion unit 240, a condenser lens 150, a first collimator lens 160, a second collimator lens 170 and a second light source 210. The light source module 200 of the present embodiment and the light source module 100 have identical or similar technical features except that the light source module 200 further includes a second light source 210 and a wavelength conversion unit 240 located between the second light source 210 and the color wheel 130.

The second light source 210 and the first light source 110 could be selected from the same type of light source, and the similarities are not repeated here.

As indicated in FIG. 6, the second light source 210 emits a second light L4 to the color wheel 130 through the wavelength conversion unit 240. In an embodiment, the wavelength conversion unit 240 and the second light source 210 could be integrated as a light source package. For example, during a packaging process, the wavelength conversion unit 240 could wrap the second light source 210, wherein the wavelength conversion unit 240 and the second light source 210 form a package. In another embodiment, after the wavelength conversion unit 240 and the second light source 210 are respectively formed, the wavelength conversion unit 240 could be disposed adjacent to (without contacting) the second light source 210 or could be directly attached on the second light source 210.

The wavelength conversion unit 240 may include several fluorescent particles 241 for converting the wavelength of the second light L4. For example, the second light L4 with the first wavelength could be converted to a converted light L5 with the second wavelength. In an embodiment, the second light L4 is a blue light, and the converted light L5 is a yellow light. Besides, the wavelength conversion unit 240 also could convert the wavelength of the light emitted from the color wheel 130. For example, the reflected light L21' with the first wavelength (such as blue light) and the second illumination light L22 (such as blue light) are converted to a converted light L3 with the second wavelength. The converted light L3 and the converted light L5 could be projected to the color wheel 130 by sequentially passing through the second collimator lens 170, the dichroic unit 120 and the condenser lens 150 to.

Besides, the light source module 100 of the projection device 10 of FIG. 1 could be replaced with the light source module 200.

To summarize, the present invention provides a light source module, the dichroic unit could split a first illumination light into a first illumination light and a second illumination light, which are respectively provided to the color wheel and the wavelength conversion unit. The second illumination light is converted into a converted light by the wavelength conversion unit and then is provided to the color wheel. In an embodiment, the second illumination light reflected from the color wheel could be reflected to the wavelength conversion unit which further recycles the reflected light to increase the utilization rate of the light.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light source module, comprising:
   a first light source configured to emit a first light;
   a dichroic unit opposite to the first light source and configured to reflect a portion of the first light as a first illumination light in a first direction and reflect a portion of the first light as a second illumination light in a second direction, wherein the first direction is inverse to the second direction;
   a color wheel opposite to the dichroic unit and configured to at least receive the first illumination light, wherein the color wheel has a blue filter area, a green filter area and a red filter area;
   a wavelength conversion unit opposite to the color wheel and the dichroic unit and configured to at least receive the second illumination light and provide a converted light to the color wheel; a condenser lens, comprising a first portion and a second portion, wherein the first illumination light passes through the first portion; and wherein the first illumination light reflected from the color wheel forms a reflected light which is projected to the wavelength conversion unit through the second portion.

2. The light source module according to claim 1, wherein the condenser lens has an optical path located between the first portion and the second portion, and the dichroic unit corresponds to the first portion in the extending direction of the optical path.

3. The light source module according to claim 1, wherein the dichroic unit has a turning point located on an extending line of an optical path of the condenser lens.

4. The light source module according to claim 1, wherein the dichroic unit has a first reflective surface, and there is an angle of 45° included between the first reflective surface and an optical path of the condenser lens.

5. The light source module according to claim 1, further comprising:
   a first collimator lens located between the dichroic unit and the first light source.

6. The light source module according to claim 5, wherein the dichroic unit has a turning point located on an extending line of an optical path of the first collimator lens.

7. The light source module according to claim 6, wherein the dichroic unit has a first reflective surface, and there is an angle of 135° included between the first reflective surface and an optical path of the first collimator lens.

8. The light source module according to claim 1, further comprising:
   a second collimator lens located between the dichroic unit and the wavelength conversion unit.

9. The light source module according to claim 8, wherein the dichroic unit has a turning point located on an extending line of an optical path of the second collimator lens.

10. The light source module according to claim 8, wherein the dichroic unit has a second reflective surface, and there is an angle of 45° included between the second reflective surface and an optical path of the second collimator lens.

11. The light source module according to claim 8, wherein the second collimator lens comprises a third portion and a fourth portion, and the second illumination light passes through the third portion;
    wherein the wavelength conversion unit converts the second illumination light into a converted light which is projected to the color wheel through the second collimator lens.

12. The light source module according to claim 11, wherein an optical path of the second collimator lens is located between the third portion and the fourth portion, and the dichroic unit corresponds to the third portion in the extending direction of the optical path the second collimator lens.

13. The light source module according to claim 1, further comprising:
    a condenser lens located between the dichroic unit and the color wheel; and
    a collimator lens located between the dichroic unit and the wavelength conversion unit;
    wherein an extending line of an optical path of the condenser lens and overlaps an extending line of the optical path of the collimator lens.

14. The light source module according to claim 1, wherein the dichroic unit is V-shaped.

15. The light source module according to claim 1, wherein the dichroic unit comprises:
    a first reflective portion configured to reflect a portion of the first light as the first illumination light; and
    a second reflective portion connected to the first reflective portion and configured to reflect a portion of the first light as the second illumination light;
    wherein an angle included between the first reflective portion and the second reflective portion is less than 180°.

16. The light source module according to claim 1, wherein the dichroic unit reflects the light with the first wavelength and allows the light with a second wavelength to pass through, and the first wavelength and the second wavelength are different.

17. The light source module according to claim 1, further comprising:
    a second light source configured to emit a second light to the color wheel through the wavelength conversion unit.

18. The light source module according to claim 1, wherein the first light has a first wavelength, the converted light has a second wavelength, and the first wavelength and the second wavelength are different.

19. The light source module according to claim 18, wherein the first wavelength is less than or equivalent to 460 nm, and the second wavelength is greater than or equivalent to 460 nm and less than or equivalent to 680 nm.

20. The light source module according to claim 1, wherein the green filter area and the red filter area are configured to reflect the first light.

* * * * *